Aug. 29, 1933.  E. E. LATHROP  1,924,559
CHANGE SPEED GEARING
Filed April 23, 1932   2 Sheets-Sheet 1
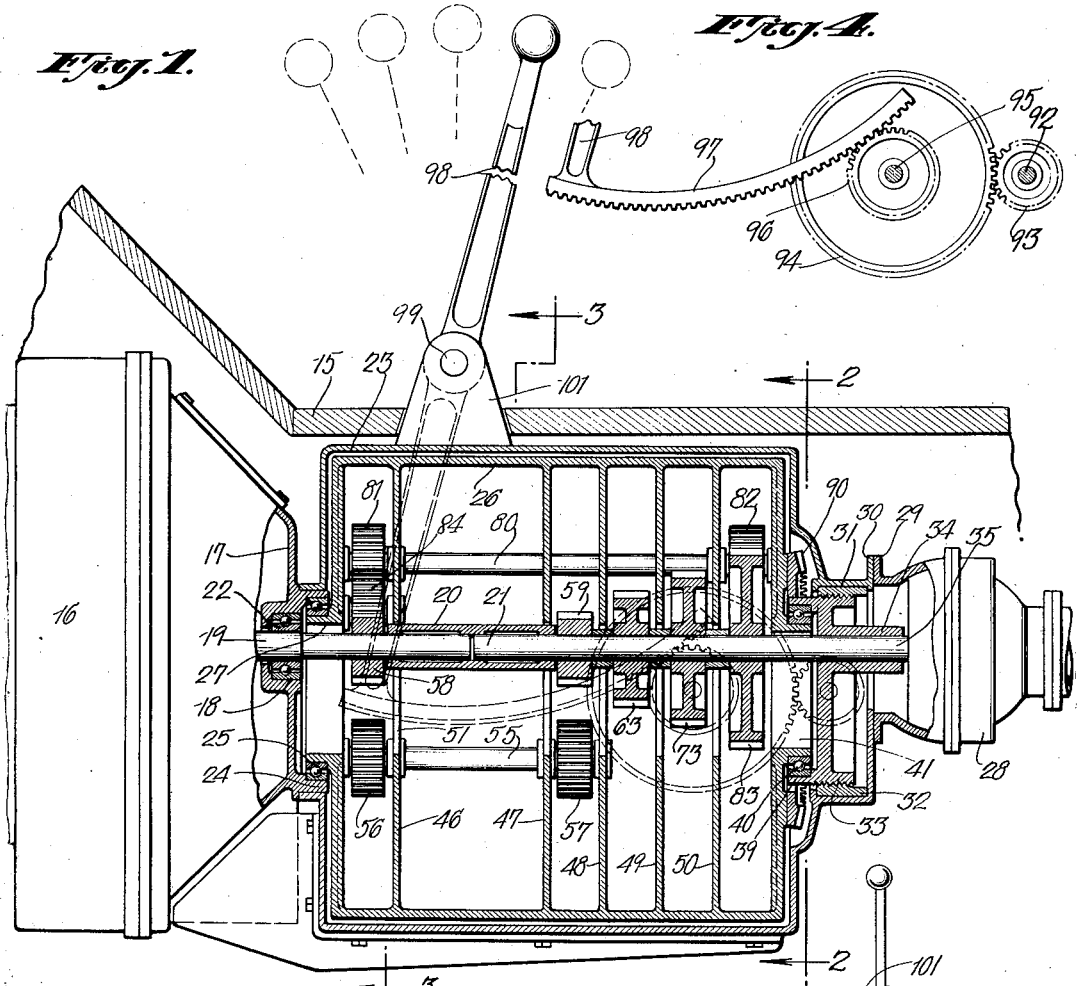
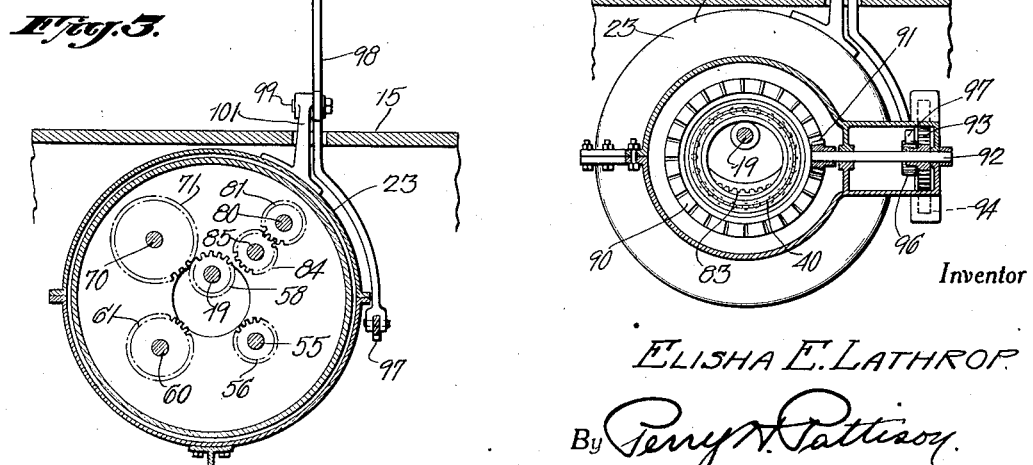
Inventor
ELISHA E. LATHROP
By Perry N. Pattison
Attorneys Aug. 29, 1933.   E. E. LATHROP   1,924,559
CHANGE SPEED GEARING
Filed April 23, 1932   2 Sheets-Sheet 2
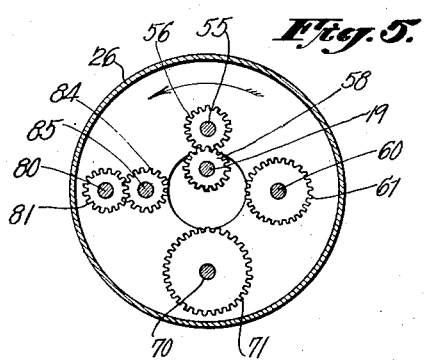
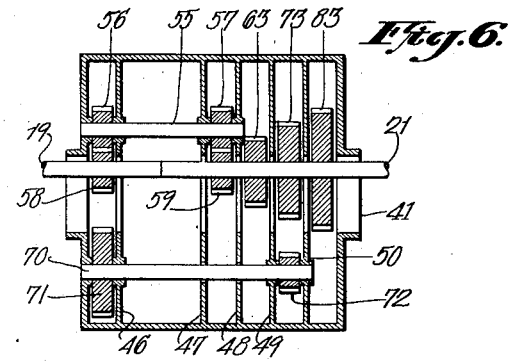
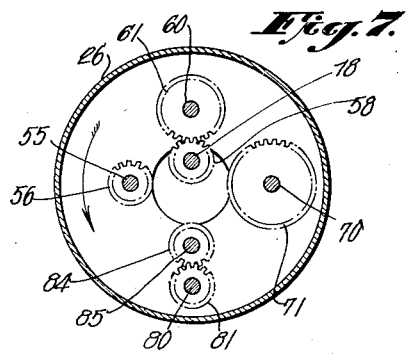
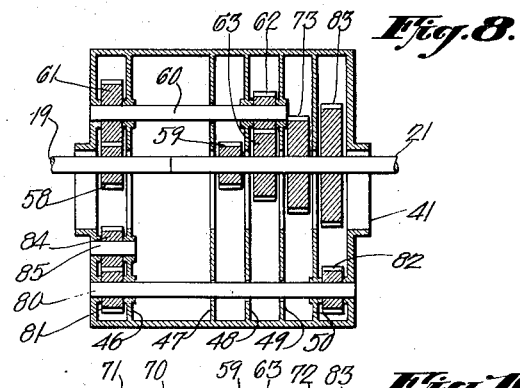
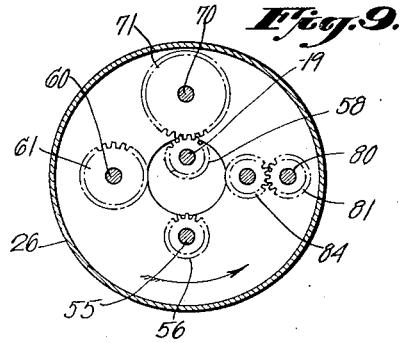
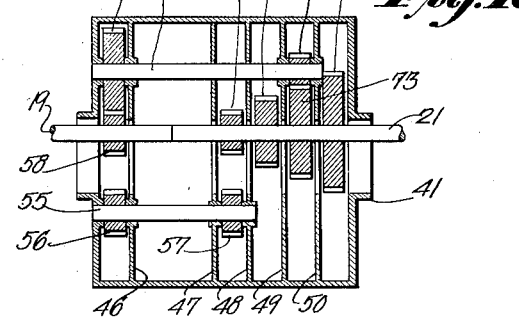
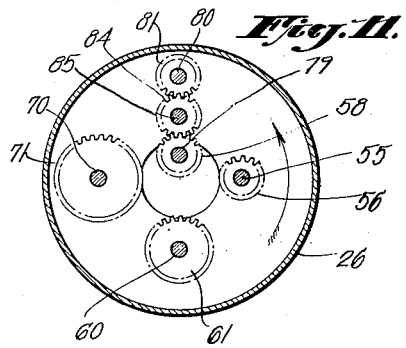
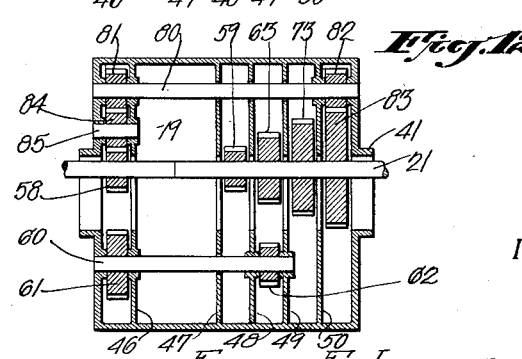
Inventor
ELISHA E. LATHROP.
By Perry N. Pattison,
Attorney Patented Aug. 29, 1933

1,924,559

UNITED STATES PATENT OFFICE 1,924,559

CHANGE SPEED GEARING

Elisha Edward Lathrop, New York, N. Y.

Application April 23, 1932. Serial No. 607,049

5 Claims. (Cl. 74—58)

The present invention relates to new and useful improvements in gearings, and more particularly it pertains to gearing of the change speed type.

One object of the present invention is to improve the construction and mode of operation of change speed gearing and so to construct such gearing that the various speeds at which the gearing may be operated may be obtained with ease and facility and without undue clashing of the gears.

A feature of the invention resides in a novel construction whereby a driving shaft and a driven shaft may be operatively connected together in order to drive the driven shaft in reverse directions, and in a forward direction at various speeds.

Another feature of the invention resides in a novel construction whereby the gears instead of being slid into mesh with one another, are rolled into mesh with one another thereby greatly reducing, if not entirely eliminating all noise attendant the changing of speeds by the intermeshing of gears.

Still another feature resides in a new and novel construction whereby the change speed gearing may be constructed in a compact form, thus rendering it particularly adaptable for use as a transmission gearing for motor vehicles, and for other types of transmission gearing wherein space is a factor.

Other features of the invention relate to certain novel and improved constructions, arrangements and combination of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In the drawings,

Figure 1 is a longitudinal sectional view illustrating a transmission gearing for motor vehicles constructed in accordance with the present invention, the several parts being shown in their neutral position.

Figure 2 is a transverse sectional view on a reduced scale taken on the line 2—2 of Figure 1, Figure 3 is a detail transverse sectional view taken on a reduced scale taken on the line 3—3 of Figure 1, Figure 4 is a fragmentary view in elevation illustrating the operating mechanism of the gearing, Figures 5, 7, 9, and 11, are transverse sectional views on a reduced scale illustrating the position of the several gears in the various speed positions, and;

Figures 6, 8, 10, and 12, are longitudinal sectional views illustrating the gears in their different positions.

In the present embodiment of my invention I have illustrated the same as applied to the transmission gearing of a motor vehicle in which various speeds may be obtained and in which a reverse direction of drive may be had. In this embodiment of this invention, the reference numeral 15 designates the floor of a vehicle. The reference numeral 16 designates the clutch housing, the clutch not being shown, thus these parts may be of any desired standard or preferred construction.

In carrying out the present invention, I provide the rear wall 17 of the clutch housing with a bearing 18 and extending through this bearing, there is a power shaft or driving shaft 19.

This driving shaft 19 has a sleeve 20 surrounding its rear end, and also mounted in this sleeve 20 is the forward end of a driven shaft 21. Mounted upon the exterior face of the rear wall 17 of the clutch housing there is a bearing 22, and mounted upon this bearing 22 there is a casing or housing 23. The bearing 22 is in the form of a rearwardly extending flange 24, and carried by the interior of said flange 24 there is an anti-friction bearing 25. This anti-friction bearing 25 forms the support for the forward end of a secondary housing 26 which has an extension 27 of its end wall mounted within said anti-friction bearing 25 as best illustrated in Figure 1.

The reference numeral 28 designates a universal joint housing and secured thereto as at 29 in any desired manner, there is a flange 30 carried by the extension 31 of the rear end of the casing or housing 23. This extension 31 carries an internally threaded collar 32 and having threaded engagement therewith there is a member 33 which has a bearing extension 34 within which the rear end 35 of the driven shaft 21 is mounted, the extremity of this shaft being connected to a universal joint within the housing 28, but not herein shown in detail. The member 33 has a flange extension 39, and this flange extension 39 carries an anti-friction bearing 40 within which is received a flanged extension 41 on the rear wall of the auxiliary housing 26.

By this means just described, the auxiliary casing or housing 26 is rotatably mounted in the anti-friction bearings 25 and 40 and may be rotated therein. It will be noted that the parts are so arranged that this auxiliary casing or housing 26 rotates about an axis which is eccentric with respect to the longitudinal axes of the driving shaft 19 and the driven shaft 21.

As best illustrated in Figure 1, the auxiliary casing or housing 26 is provided with a plurality of internal radially disposed partitions 46, 47, 48, 49, and 50, and these partitions are provided with a central opening 51 through which the shafts 19 and 21 extend.

These several partitions just mentioned form bearing supports and a plurality of shafts are mounted in the bearings carried by these partitions, which constructions will be hereinafter described.

The reference numeral 55 designates a shaft mounted in bearings carried by the partitions 46 and 47. On the forward end of this shaft 55 there is a gear 56, and on the rear end thereof there is a gear 57. These gears 56 and 57 are of the same value. A gear 58 is mounted upon the driving shaft in such a manner as to rotate therewith, and a gear 59 is mounted on the driven shaft 21 in such manner as to impart power thereto when power is imparted to the gear 59.

It is to be understood that the gears 58 and 59 are of the same value and that when the gear 56 is brought in mesh with the gear 58, and the gear 57 is brought into mesh with the gear 59, the shaft 21 will be rotated at the same speed as is the shaft 19.

The position of the gears just described is clearly illustrated in Figures 5 and 6 of the drawings, and this position of the gears, driving the driven shaft 21 at corresponding number of revolutions per minute with the driving shaft 19 is that position commonly known as "third" or high speed in automobile gearing.

In Figures 7 and 8 of the drawings, I have illustrated the position of the several gears when the driven shaft 21 is driven from the driving shaft 19 at intermediate speed. To produce this speed ratio between the shafts 19 and 21, a shaft 60 is mounted in the partitions 46, 47, 48 and 49. At its forward end this shaft 60 carries a gear 61 which is of greater value than the gear 56 heretofore described, and at its rear end carries a gear 62 which latter is mounted between the partitions 48 and 49, and which is adapted to mesh with a gear 63 upon the driven shaft 21. This position of the parts is illustrated in Figures 7 and 8 of the drawings, and it will be noted that the gears 61 and 62 are of such size that the speed or number of revolutions per minute of the shaft 21 will be reduced with relation of those of the shaft 19 dependent upon the values of the gears 61, 62 and 63. This position of the several parts is illustrated in Figures 7 and 8.

In Figures 9 and 10 I have shown the parts in that position which they occupy when the driven shaft 21 is to be driven in "first" or low speed. By reference to these figures it will be noted that there is a shaft 70 mounted in the partitions 46, 47, 48, 49 and 50. This shaft 70 carries at its forward end a gear 71, and at its rear end a gear 72, the latter gear being smaller in diameter than the gear 71, and the gear 72 meshes with a relatively larger gear 73 mounted upon the driven shaft 21. Thus it will be apparent that for any given speed of the driving shaft 19, when the gears 71 and 72 are in engagement with the gears 58 and 73, the driven shaft 21 will be driven at a speed considerably reduced as compared with the speed of the shaft 19.

In Figures 11 and 12 I have shown the parts in that position which they occupy when the driven shaft 21 is reversed in its direction of movement with relation to the driving shaft 19. In Figures 11 and 12 it will be noted that there is a shaft 80 mounted in the end wall of the auxiliary casing or drum 26 and in each of the several partitions. This shaft 80 carries a gear 81 at its forward end and a gear 82 at its rear end. The gear 82 meshes with a relatively large gear 83 carried by the driven shaft 21, while the gear 81 meshes with an idler gear 84 mounted on a shaft 85 carried by the front walls of the auxiliary casing or housing 26. Thus as the idler gear 84 is brought into mesh with the gear 58 carried by the driving shaft 19, the shaft 21 will be driven in a reverse direction through the medium of the shaft 80 and its gears 81 and 82, the latter of which meshes with the gears 83.

Means is provided to rotate the auxiliary casing or housing 26 and to accomplish this result, the same is provided upon its end with a beveled gear 90. Meshing with this beveled gear 90 there is a small beveled gear 91 carried by a shaft 92 the outer end of which carries a gear 93. As best illustrated in Figure 4, this gear 93 meshes with a relatively large gear 94 carried upon a shaft 95 and upon which is mounted a gear 96. Meshing with the gear 96 there is an arcuate gear 97 carried by a hand lever 98 which latter is pivotally mounted as at 99 between lugs 100 suitably mounted upon the main casing or housing 23.

By this construction it will be obvious that as the hand lever 98 is rocked about its pivotal point to the several dotted line positions in which it is illustrated in Figure 1, the auxiliary casing or housing 26 will be rotated to move the several gears into mesh in the manner heretofore described to produce different speeds of rotation, as well as different directions of rotation of the driven shaft 21 by the power or driving shaft 19.

Suitable means may be provided to lock the hand lever in any one of its adjusted positions, or if desired, suitable means (not herein illustrated) may be employed to lock the auxiliary casing or housing 26 in the different positions in which the several gears are meshed with one another to produce the desired speed.

While the invention has been herein disclosed in a preferred form, it is to be understood that the invention is not to be limited to the specific construction herein illustrated, and that it may be practiced in other forms without departing from the spirit thereof.

Having thus described the invention, what is claimed as new, and what it is desired to secure by Letters Patent of the United States, is:—

1. A transmission gearing comprising a power shaft, a driven shaft in axial alinement therewith, a gear on said power shaft, a plurality of gears on said driven shaft, a rotatable cylindrical casing enclosing said power shaft, driven shaft and the gears carried thereby, said casing being mounted eccentrically with relation to said power and driven shafts, a plurality of shafts mounted within said casing and carried thereby, said shafts extending parallel to the power and driven shafts, a gear carried by each end of each of said shafts adapted to mesh with their respective gears on the power and driven shafts, whereby to drive the driven shaft at speeds different from the speed of the power shaft, said shafts and gears being so constructed and arranged that rotation of the casing will bring the gears carried by said plurality of shafts successively into mesh with the gears of power and driven shafts, and means to rotate said casing.

2. An assembly of the type described comprising a housing, a casing rotatably mounted in the housing, a power shaft projecting into said casing, a driven shaft projecting from said casing said shafts being in axial alinement, a single gear carried by said power shaft, a plurality of gears carried by said driven shaft, a plurality of shafts mounted in said casing and extending parallel with the power shaft and the driven shaft, and a plurality of gears carried by said shafts and adapted to connect the gears of the driven shaft with the gear of the driving shaft upon rotation of the casing.

3. In a gear assembly, a driving shaft and a driven shaft arranged in axial alignment with one another, a single gear carried by the driving shaft, a plurality of gears carried by the driven shaft, means for operatively connecting the driving gear of the driving shaft singly with the driven gears of the driven shaft, a stationary housing enclosing said driving shaft, driven shaft and gears and a rotating housing within the stationary housing, said rotating housing forming the support for the means for connecting the driven gears with the driving gear.

4. In a gearing assembly, a driving shaft and a driven shaft mounted in axial alignment with one another, a gear carried by the driving shaft, a plurality of gears carried by the driven shaft, means for connecting the gear of the driving shaft singly with the gears of the driven shaft, a stationary housing enclosing said driving shaft, driven shaft and gears, a rotating housing mounted within the stationary housing, said rotating housing forming a support means for the means connecting the driving gear with the driven gears and manually operated means for rotating said rotating housing within the stationary housing to connect the driving gear singly with the driven gears.

5. In a gearing assembly, a driving shaft and a driven shaft mounted in axial alignment with one another, a gear carried by the driving shaft, a plurality of gears carried by the driven shaft, means for connecting the gear of the driving shaft singly with the gears of the driven shaft, a stationary housing enclosing said driving shaft, driven shaft and gears, a rotating housing mounted within the stationary housing, said rotating housing forming a support means for the means connecting the driving gear with the driven gears and manually operated means for rotating said rotating housing within the stationary housing to connect the driving gear singly with the driven gears, said last mentioned means comprising a gear carried by the rotating housing, a second gear meshing therewith, a manually operated pivoted lever, and a rack carried by said pivoted lever and adapted to rotate the gear meshing with the gear carried by the rotating housing upon movement of the pivoted lever.

ELISHA EDWARD LATHROP.